United States Patent
Kim et al.

(10) Patent No.: US 9,332,084 B2
(45) Date of Patent: *May 3, 2016

(54) SANDBOXING CONTENT OPTIMIZATION AT THE NETWORK EDGE

(71) Applicant: Edgecast Networks, Inc., Santa Monica, CA (US)

(72) Inventors: Hayes Kim, Northridge, CA (US); Robert J. Peters, Santa Monica, CA (US); Sergio Leonardo Ruiz, Redondo Beach, CA (US); James Segil, Santa Monica, CA (US)

(73) Assignee: EDGECAST NETWORKS, INC., Santa Monica, CA (US)

(*) Notice: Subject to any disclaimer, the term of this patent is extended or adjusted under 35 U.S.C. 154(b) by 268 days.

This patent is subject to a terminal disclaimer.

(21) Appl. No.: 14/058,490

(22) Filed: Oct. 21, 2013

(65) Prior Publication Data

US 2014/0082126 A1  Mar. 20, 2014

Related U.S. Application Data

(63) Continuation of application No. 13/623,051, filed on Sep. 19, 2012, now Pat. No. 8,583,763.

(51) Int. Cl.
*G06F 15/16* (2006.01)
*H04L 29/08* (2006.01)
*G06F 21/53* (2013.01)
*G06F 21/10* (2013.01)

(52) U.S. Cl.
CPC ............ *H04L 67/2842* (2013.01); *G06F 21/10* (2013.01); *G06F 21/53* (2013.01); *H04L 67/02* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 5,935,207 A | 8/1999 | Logue et al. | |
| 6,026,413 A | 2/2000 | Challenger et al. | |
| 6,237,031 B1 * | 5/2001 | Knauerhase | G06F 17/30905 707/E17.121 |
| 6,785,769 B1 | 8/2004 | Jacobs et al. | |
| 6,976,090 B2 | 12/2005 | Ben-Shaul et al. | |
| 2003/0065810 A1 | 4/2003 | Ims et al. | |
| 2003/0115346 A1 | 6/2003 | McHenry et al. | |
| 2003/0115421 A1 | 6/2003 | McHenry et al. | |
| 2004/0205162 A1 | 10/2004 | Parikh | |
| 2007/0156845 A1 | 7/2007 | Devanneaux et al. | |
| 2008/0228920 A1 | 9/2008 | Souders et al. | |
| 2011/0082982 A1 * | 4/2011 | Harvell | G06F 17/30902 711/122 |
| 2011/0252160 A1 | 10/2011 | Wu | |
| 2011/0276623 A1 | 11/2011 | Girbal | |

* cited by examiner

*Primary Examiner* — Scott B Christensen

(57) ABSTRACT

Some embodiments provide systems and methods for sandboxing content optimization to occur entirely within a network edge or PoP of a CDN. Some embodiments pass a first request for a first URL to a first back-end at the network edge that is configured to cache an optimized instance of the particular object. When the optimized instance of the particular object is not cached at the first back-end, a second request is issued for a second URL identifying a non-optimized instance of the particular object. The second request resolves internally within the network edge to a second back-end that is configured to cache the non-optimized object. The non-optimized object from the second back-end is optimized and passed to the first back-end. The first back-end caches the optimized instance of the non-optimized object and serves the optimized instance to a requesting end user.

20 Claims, 11 Drawing Sheets

SANDBOXING CONTENT OPTIMIZATION AT THE NETWORK EDGE

CLAIM OF BENEFIT TO RELATED APPLICATIONS

This application is a continuation of U.S. non-provisional application Ser. No. 13/623,051, entitled "Sandboxing Content Optimization at the Network Edge", filed Sep. 19, 2012. The contents of application Ser. No. 13/623,051 are hereby incorporated by reference

TECHNICAL FIELD

The present invention relates to content caching and content delivery networks.

BACKGROUND ART

Content delivery networks (CDNs) have greatly improved the transfer of content across data networks such as the Internet. One way that a CDN improves the transfer of content is to reduce the distance that content travels in order to reach a destination. To do so, the CDN operator strategically locates CDN caching servers also referred to as CDN edge servers, at various points-of-presence (PoPs) that are geographically proximate to large numbers of end users. CDN customers are content providers that offload their content to the CDN caching servers. The CDN caching servers cache the offloaded content and deliver the content on behalf of the CDN customers or content providers. More particularly, from the geographically proximate locations of the CDN caching servers to the end users, the CDN caching servers serve the cached content to end users in a manner that is more efficient than if the content providers were to serve the content themselves. The CDN uses a traffic management system to route a request for cached content to the CDN caching server that can optimally deliver the requested content to the requesting end user. As used hereafter, optimal delivery of content refers to the most efficient available means by which content can be delivered from a CDN caching server to an end user machine over a data network.

Determination of the optimal CDN caching server may be based on geographic proximity to the requesting end user as well as other factors such as latency, jitter, packet loss, load, capacity, and responsiveness of the CDN caching servers. The optimal CDN caching server delivers the requested content to the requesting end user in a manner that is more efficient than when origin servers of the content provider (i.e., CDN customer) deliver the requested content or when other CDN caching servers at different PoPs of the CDN deliver the content. For example, a CDN operator may deploy CDN caching servers to form PoPs in Los Angeles, Dallas, and New York. These CDN caching servers may cache content that is published by a particular content provider customer that has an origin server in Miami. When a requesting end user in San Francisco submits a request for the content of the particular content provider customer, the CDN will deliver the content from a CDN caching server at the Los Angeles PoP on behalf of the particular content provider customer, as opposed to the much greater distance that would be required when delivering the content from the particular content provider customer's origin server in Miami. In this manner, the CDN reduces the latency, jitter, and amount of buffering that is experienced by the requesting end user.

The foregoing presents a rudimentary and basic overview of CDNs as they existed in their initial incarnations. Subsequent incarnations have introduced new features and enhancements that further accelerate the delivery of content. For example, many CDNs now offer various levels of dynamic content caching, prefetching, and application execution at the edge.

As the evolutionary cycle continues, there remains an ever-present need to improve the content delivery capabilities of a CDN. This need translates to identifying new optimizations as well as improving the current means by which content is delivered to end users. This need further translates into improving the content delivery capabilities of the CDN without scaling the resources of the CDN. In other words, there is a need to improve how the CDN can improve content delivery based on its existing resources. To this end, there is a need to provide an architecture to automatically optimize the content of different CDN customers before delivering that content to end user. Moreover, there is need to maximize the content delivery performance gains that can be realized from content optimization by minimizing the processing and network access needed in order to perform the optimizations.

SUMMARY OF THE INVENTION

It is an objective of the embodiments described herein to improve the content delivery capabilities of a CDN by intelligently optimizing content at the network edge prior to disseminating that content to an end user requesting the content. To do so, it is objective to leverage the distributed architecture and, more specifically, the distributed cache so as to sandbox content optimization entirely at the network edge. Meeting these objectives reduces the processing overhead and network access times required to dynamically optimize content of different CDN content provider customers, thereby improving the content delivery capabilities of the CDN. Furthermore, by optimizing the content at the network edge, the CDN provides an optimization solution that frees CDN content provider customers from having to pre-optimize or perform content optimization locally before offloading the delivery duties of the content to the CDN. As a result, CDN customers can focus on the creation of content and rely on the CDN to ensure the optimized delivery of that content.

To achieve these and other objectives, some embodiments implement architectural enhancements to various caching server or edge servers of a CDN. These enhancements enable sandboxed content optimization at the network edge irrespective of the customer content being optimized. This minimizes access outside the network edge and, more specifically, minimizes access back to an origin or other location within an external network when performing the various optimizations. Consequently, content that is being optimized is present at the network edge when needed.

In some embodiments, the enhancements include modifying a CDN edge server to include an optimization agent, a front-end agent, and a back-end agent. The optimization agent automatically identifies available optimizations that can be made to requested content and the optimization agent applies the best available optimization(s) to the requested content. In some embodiments, the optimization agent executes the "mod_pagespeed" Apache module to perform the desired optimizations.

Delivering the optimized content produced by the optimization agent instead of the non-optimized content originally offloaded to the CDN by the CDN customers provides a first level of CDN performance gains. These first level of CDN performance gains are realized as a result of the optimized content requiring less bandwidth to transfer than the non-optimized content. Consequently, the CDN is able to deliver the optimized content to an end user faster than delivering the same content when it is not optimized.

The enhanced architecture also provides a second level of CDN performance gains based on the combined operation of the optimization agent with the front-end agent and the back-end agent. These second level of CDN performance gains are realized by way of sandboxing the content optimization to occur at the network edge. Specifically, the enhanced architecture can be leveraged to cache content that is optimized by the optimization at the network edge. In so doing, the optimized content can be served without having to reperform the optimizations the next time the content is requested. Also, the enhanced architecture can be leveraged to cache the non-optimized content that is needed to produce the desired optimizations at the network edge. This allows the CDN edge servers and more specifically, the optimization agents, to optimize content on-the-fly without the latency and overhead associated with retrieving the non-optimized content from outside the network edge.

The front-end agent operates to forward requests to the appropriate back-end agent. The back-end agent maintains a cache for retaining the non-optimized content of different content providers at the network edge. The back-end agent also maintains the cache for retaining content that the optimization agent has previously optimized.

The optimization agent leverages the front-end agents and the back-end agents at a network edge (i.e., a specific CDN PoP) to determine if requested content has already been optimized, cached, and can be served from cache. When the requested content has not already been optimized, the optimization agent leverages the front-end agents and the back-end agents to retrieve a copy of the non-optimized content being requested from within the network edge. By retrieving a copy of the non-optimized content from within the network edge, the optimization agent avoids the greater latency and additional overhead for retrieving the non-optimized content from outside the network edge such as from a CDN customer's origin server. The architecture thereby facilitates a more efficient optimization of content, wherein the efficiency gains result in real-world performance delivery advantages for the CDN.

In some embodiments, the back-end agents prefetch non-optimized content. In this scenario, a back-end agent retrieves a base HTML page in response to an end user request for content. The back-end agent provides the base HTML page to the end user as well as a local optimization agent. The local optimization agent identifies the best available optimizations for that content. Before the requesting end user requests the embedded objects within the base HTML from the edge server, the back-end agent prefetches and caches those objects. When the requests arrive from the end user, the optimization agent can then retrieve the requested objects from cache instead of a location outside the network edge, perform the optimizations at the network edge, and serve the optimized content from the network edge.

BRIEF DESCRIPTION OF THE DRAWINGS

In order to achieve a better understanding of the nature of the present invention, preferred embodiments for systems and methods for sandboxing content optimization at the network edge will now be described, by way of example only, with reference to the accompanying drawings in which.

DETAILED DESCRIPTION

In the following detailed description, numerous details, examples, and embodiments for systems and methods for sandboxing content optimization at the network edge are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

Figure 1:
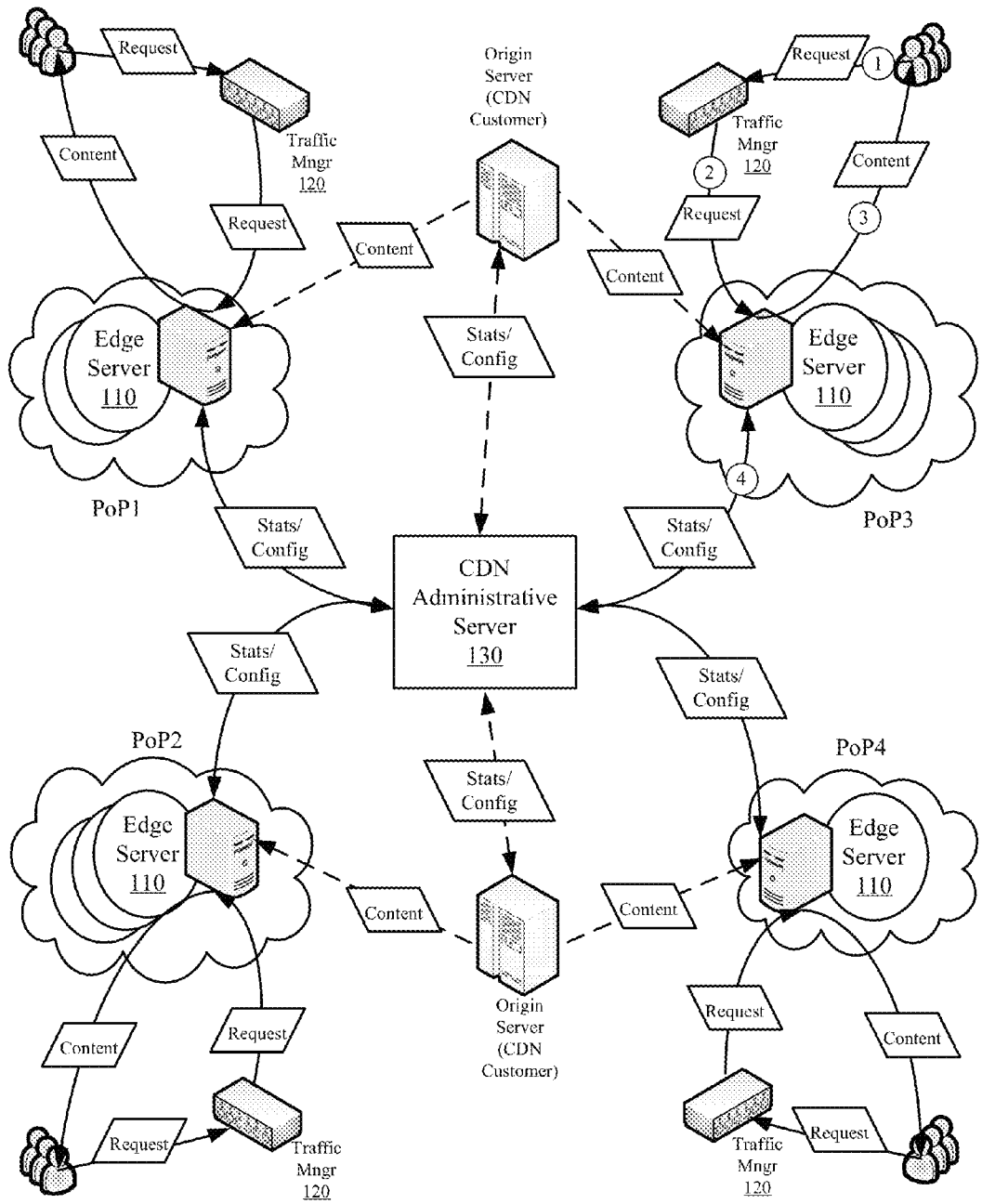
FIG. 1 presents an exemplary CDN architecture.

To facilitate the discussion, an overview of an exemplary CDN architecture is presented in FIG. 1. As shown in FIG. 1, the architecture includes a distributed set of edge servers 110, traffic management servers 120, and an administrative server 130. The figure also illustrates the interactions that CDN customers including content providers have with the CDN and interactions that content consumers or end users have with the CDN.

Each edge server of the set of edge servers 110 may represent a single physical machine or a cluster of machines that serves content on behalf of different content providers to end users. The cluster of machines may include a server farm for a geographically proximate set of physically separate machines or a set of virtual machines that execute over partitioned sets of resources of one or more physically separate machines. The set of edge servers 110 are distributed across different network edges of the Internet to facilitate the "last mile" delivery of content. Each cluster of servers at a particular network edge may represent a point-of-presence (PoP) of the CDN, wherein an end user is typically routed to the closest PoP in order to download content from the CDN with the goal of minimizing the time needed to deliver the content to the end user.

The traffic management servers 120 route end users, and more specifically, end user issued requests for content to one or more edge servers that can optimally deliver the requested content back to the end users. Different CDN implementations utilize different traffic management schemes to achieve such routing. For the purposes of the discussion that is to follow, the traffic management scheme performs Anycast routing to identify a server from the set of servers 110 that can optimally serve requested content to a particular end user requesting the content. However, it should be apparent that other traffic management schemes such as Domain Name System (DNS) routing can be used and that the traffic management servers 120 can include different combinations of DNS servers, load balancers, and routers performing Anycast or Border Gateway Protocol (BGP) routing.

The administrative server 130 may include a central server of the CDN or a distributed set of interoperating servers that perform the configuration control and reporting functionality of the CDN. Content providers register with the administrative server 130 in order to access services and functionality of the CDN. Accordingly, content providers are also referred to as customers of the CDN. Once registered, content providers can interface with the administrative server 130 to specify a configuration, designate content to be offloaded to the CD for delivery, and view performance reports. The administrative server 130 also aggregates statistics data from each server of the set of edge servers 110 and processes the statistics to produce usage and performance reports. From these reports, the content provider can better understand the demand for its content, the performance provided by the CDN in delivering the content provider's content, and the need for capacity reallocation, among other uses.

This distributed architecture enables the CDN to deliver content from the network edge. As a result, content is delivered with less latency, packet loss, etc. for a majority of end users than when that same content is delivered from more distant origin servers of a content provider.

Some embodiments improve upon this distributed architecture by making it possible for the CDN edge servers to optimize the content that they deliver prior to its delivery. In so doing, the CDN realizes an additional first degree of content delivery performance gains by delivering optimized content that requires less bandwidth for delivery and/or fewer processing resources for rendering than when delivering non-optimized content.

Furthermore, some embodiments provide architectural enhancements and interworking that sandboxes the optimization entirely at the network edge. By sandboxing content optimization at the network edge, the CDN realizes an additional second degree of content delivery performance gains by eliminating delays associated with retrieving the content that is needed for optimization from outside the network edge. Stated differently, the architectural enhancements and interworking set forth herein exploits the distributed cache of the various edge servers at a particular CDN PoP to provide an expansive pool of cached (i) optimized content that can be served from cache to satisfy subsequent requests for the same optimized content without having to expend the processing resources needed to reperform the optimizations and (ii) non-optimized content that can be rapidly retrieved for optimization from local cache as opposed to the greater latency that would be introduced if the non-optimized content was retrieved from an origin server that is located outside the network edge. Moreover, the architectural enhancements and interworking enable deterministic identification of whichever edge server at a particular PoP caches the optimized and non-optimized content.

Figure 2:
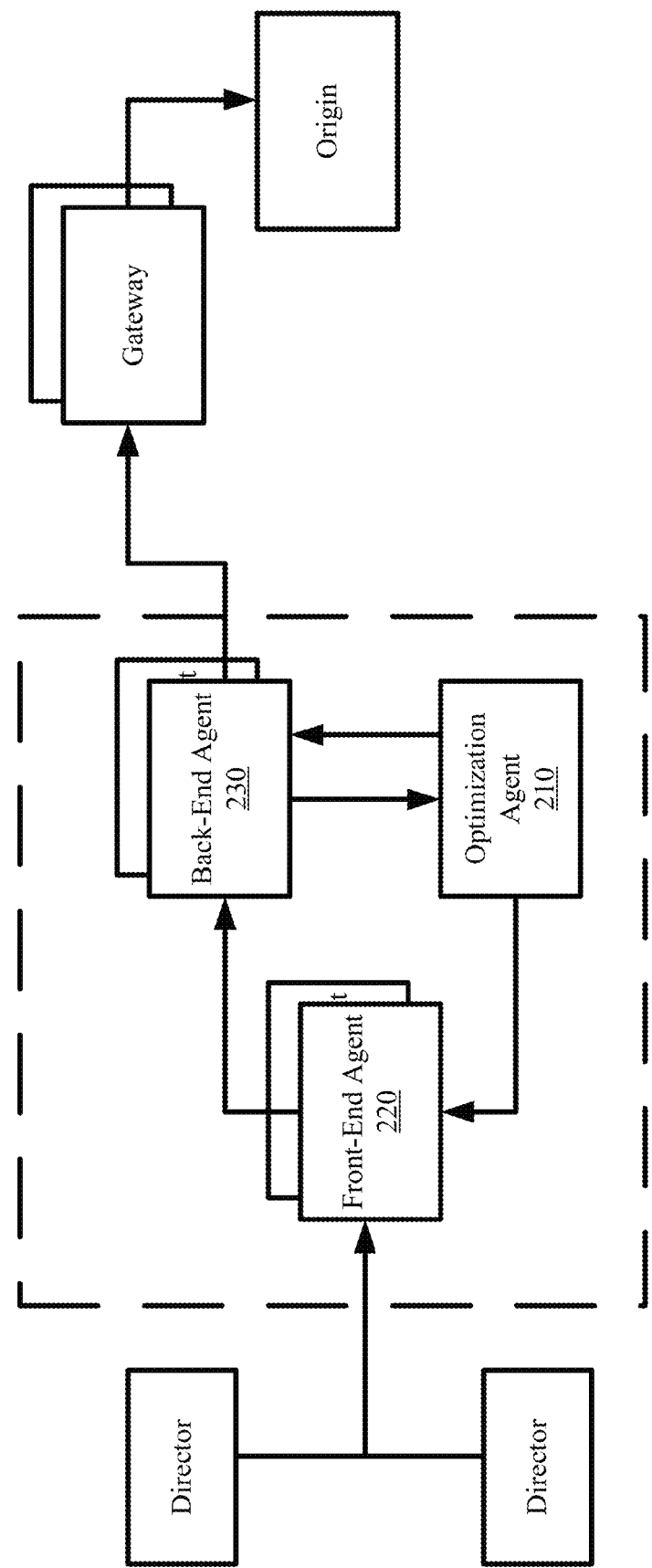
FIG. 2 illustrates the architectural enhancements to a CDN edge server that enables the sandboxed content optimization in accordance with some embodiments.

FIG. 2 illustrates the architectural enhancements to a CDN edge server that enables the sandboxed content optimization in accordance with some embodiments. As shown, the enhanced CDN edge server includes an optimization agent 210, one or more front-end agents 220, and one or more back-end agents 230. Though the front-end agent 220 and the back-end agent 230 may be referred to in the singular below, it should be apparent that the reference can similarly be made to apply to either a plurality of front-end agents or a plurality of back-end agents that run on a particular enhanced CDN edge server.

Each of the agents 210, 220, and 230 represent a module of the CDN edge server, wherein the module includes software elements that encode processes for execution by the hardware components of the CDN edge server. Some of these hardware components are enumerated with reference to FIG. 11 below. These modules transform general computing resources of the CDN edge server (e.g., processor, memory, non-transitory computer-readable medium, etc.) to a specialized machine that provides the sandboxed content optimization as disclosed herein. Each of the agents 210, 220, and 230 is identified by a unique Internet Protocol (IP) address or virtual IP address (VIPs). The addressing allows the agents to intercommunicate using standardized network protocols (e.g., IP, Transmission Control Protocol (TCP), User Datagram Protocol (UDP), etc.) or other proprietary network protocols.

The optimization agent 210 is encoded to perform various content optimizations in order to best adapt content for network transfer to an end user. The optimization agent 210 inspects requested content to identify the optimizations that it can perform for each of the objects. Examples of the optimizations that are supported by the optimization agent 210 include compression, resolution modification, domain shard-ing, white space and comment removal, inlining, and asset relocation. In some embodiments, the optimization agent 210 is an instance of the Apache mod_pagespeed module implementing Google's PageSpeed optimizations. This module defines the algorithms for identifying the best practice optimizations to apply to various content and the methods to perform any one or more of the identified optimizations. It should be apparent to one of ordinary skill that the optimization agent 210 may implement other open source or proprietary content optimization modules or other supplementary modules including security modules such as the mod_security module.

In some embodiments, the optimization agent 210 provides a cache to store content that has been optimized or store non-optimized copies of content that are used to produce various optimized versions of that content. Alternatively or additionally, some embodiments utilize the optimization agent 210 cache to store metadata that tracks what content has already been optimized instead of actually storing the optimized content. In some such embodiments, the optimization agent 210 leverages the cache of the back-end agents 230 to actually store the content.

While the optimizations performed by the optimization agent 210 enable the CDN to achieve a first degree of content delivery performance gains, a second degree of content delivery performance gains are realized based on the collective interworking of one or more optimization agents, front-end agents, and back-end agents of one or more enhanced edge servers at any network edge or CDN PoP. The collective interworking between the one or more optimization agents, front-end agents, and back-end agents sandboxes content optimization to occur wholly within the network edge hosting those agents. As noted above, the interworking and resulting sandboxed content optimization at the network edge eliminates the latency and other performance penalties that would result if content required for the content optimization was retrieved from outside the network edge when performing the optimizations.

The front-end agent 220 deterministically identifies a back-end agent within the same network edge as the front-end agent 220 that is tasked with caching requested content. In some embodiments, the front-end agent 220 performs the deterministic identification of the back-end agent by hashing an identifier that is included within the request for that content. The identifier may include a Uniform Resource Locator (URL) that identifies the content being requested. Alternatively or additionally, the identifier may also include a domain name, hostname, or Internet Protocol (IP) address and port combination as some other examples. The hashing algorithm executed by the front-end agent 220 may include the Cache Array Routing Protocol (CARP). The front-end agent 220 may identify any of several back-end agents that run on the same edge server as the front-end agent 220. The front-end agent 220 may also identify any of several back-end agents that run on any edge server within the same PoP as the edge server running the front-end agent 220. Accordingly, each CDN PoP is configured as a distributed cache with each back-end agent of the different edge servers that is a part of that distributed cache being tasked with caching a specific partitioned subset of content cacheable by the CDN.

Content requests may be passed to the front-end agent 220 from any Internet router or from one or more load balancing appliances that distribute content requests amongst the various front-end agents of a particular PoP. Additionally, each optimization agent within a particular PoP is configured with a fetch module that enables the optimization agent to submit requests for non-optimized and optimized content to at least one front-end agent. Using the fetch module and the front-end agent 220 functionality, the optimization agent 210 is able to access the entire distributed cache that is formed by the collective operation of the back-end agents at a particular PoP. In other words, the optimization agent 210 can retrieve non-optimized content and optimized content from the cache of any back-end agent that operates in the same PoP as that optimization agent 210. In some embodiments, the optimization agent 210 is configured to directly communicate with one or more back-end agents 230 without the front-end agent 220 acting as an intermediary.

When the front-end agent 220 identifies the back-end agent 230 for a given content request, the front-end agent 220 passes the content request to the identified back-end agent 230. This may include passing a HyperText Transfer Protocol (HTTP) GET request from the front-end agent 220 to the identified back-end agent 230.

Each back-end agent 230 operates a cache that locally stores content. Content may be cached to either volatile memory and/or non-volatile memory of the back-end agent 230. In some embodiments, volatile memory includes main memory such as Random Access Memory (RAM) and non-volatile memory includes secondary memory such as magnetic disk or solid state disk. Various content replacement policies control how the cache is managed and how content is entered and removed from cache. The deterministic allocation of content requests by the front-end agents to the various back-end agents of a PoP yields a collective cache for that PoP, whereby the back-end agents of that PoP avoid caching redundant copies of the same content. In other words, if each of ten enhanced CDN edge servers of a specific PoP contains a single back-end agent with a one hundred gigabyte cache, then any of the front-end agents and optimization agents within that PoP can pull and store content to the collective terabyte cache. Such a distributed shared cache is ideally suited for sandboxed content optimization as more optimized and non-optimized content can be cached at any given time, thereby minimizing the need to prefetch content.

The back-end agent 230 is also adapted to interwork with the optimization agent 210 in order to sandbox content optimization at the network edge. In some embodiments, the back-end agent 230 is configured to prioritize forwarding a content request to a specific optimization agent over a content provider origin when the requested content is not cached at the back-end agent 230. In some embodiments, the back-end agent 230 is configured to forward all content requests to the optimization agent. The optimization agent then directs the back-end agent 230 whether to satisfy the content request with content from cache or to await optimized content from the optimization agent. This interworking is described in detail with reference to FIGS. 4-8 below. There are at least three different ways by which the interworking of the back-end agent 230 and the optimization agent 210 supports the ability for the CDN to sandbox content optimization at the network edge.

A first way in which the back-end agent 230 supports the optimization agent 210 in sandboxing content optimization at the network edge is by opening the back-end agent 230 cache to store optimized content produced by the optimization agent 210 and other optimization agents that are within the same PoP as the back-end agent 230. In so doing, subsequent requests for the optimized content can be served from the back-end agent 230 cache without the optimization agent 210 having to re-perform the optimizations needed to produce the optimized content. In so doing, the CDN (1) realizes a first degree of content delivery performance gains by serving optimized content that requires less bandwidth and/or processing resources to deliver to the end user than non-optimized content and (2) realizes a second degree of content delivery performance gains by delivering that optimized content from cache of the back-end agent 230 without the optimization agent 210 re-optimizing previously requested and optimized content. As a result, content optimization is entirely sandboxed at the network edge.

A second way in which the back-end agent 230 supports the optimization agent 210 in sandboxing content optimization at the network edge is by configuring the optimization agent 210 to deterministically obtain copies of non-optimized content that it needs to produce the optimized content from the cache of any back-end agent operating in the same CDN PoP as the optimization agent 210. In so doing, the CDN (1) realizes a first degree of content delivery performance gains by serving optimized content and (2) realizes a second degree of content delivery performance gains by retrieving non-optimized content that is subsequently optimized from local cache (i.e., from within the same PoP) instead of retrieving the same content from a more distant origin server of a content provider. As a result, content optimization remains sandboxed within the network edge.

A third way in which the back-end agent 230 supports the optimization agent 210 in sandboxing content optimization at the network edge is by prefetching content in anticipation of optimizations that are to be performed by the optimization agent 210. The prefetching realizes the same benefits detailed above. Specifically, the non-optimized content that the optimization agent 210 uses to generate the optimized content is prefetched and made available at the network edge by the time it is requested from the optimization agent 210 by an end user. As a result of the prefetching, content optimization remains sandboxed within the network edge. More importantly, the optimization agent 210 can perform the content optimizations without the delay associated with retrieving non-optimized content from outside the network edge.

Figure 3:
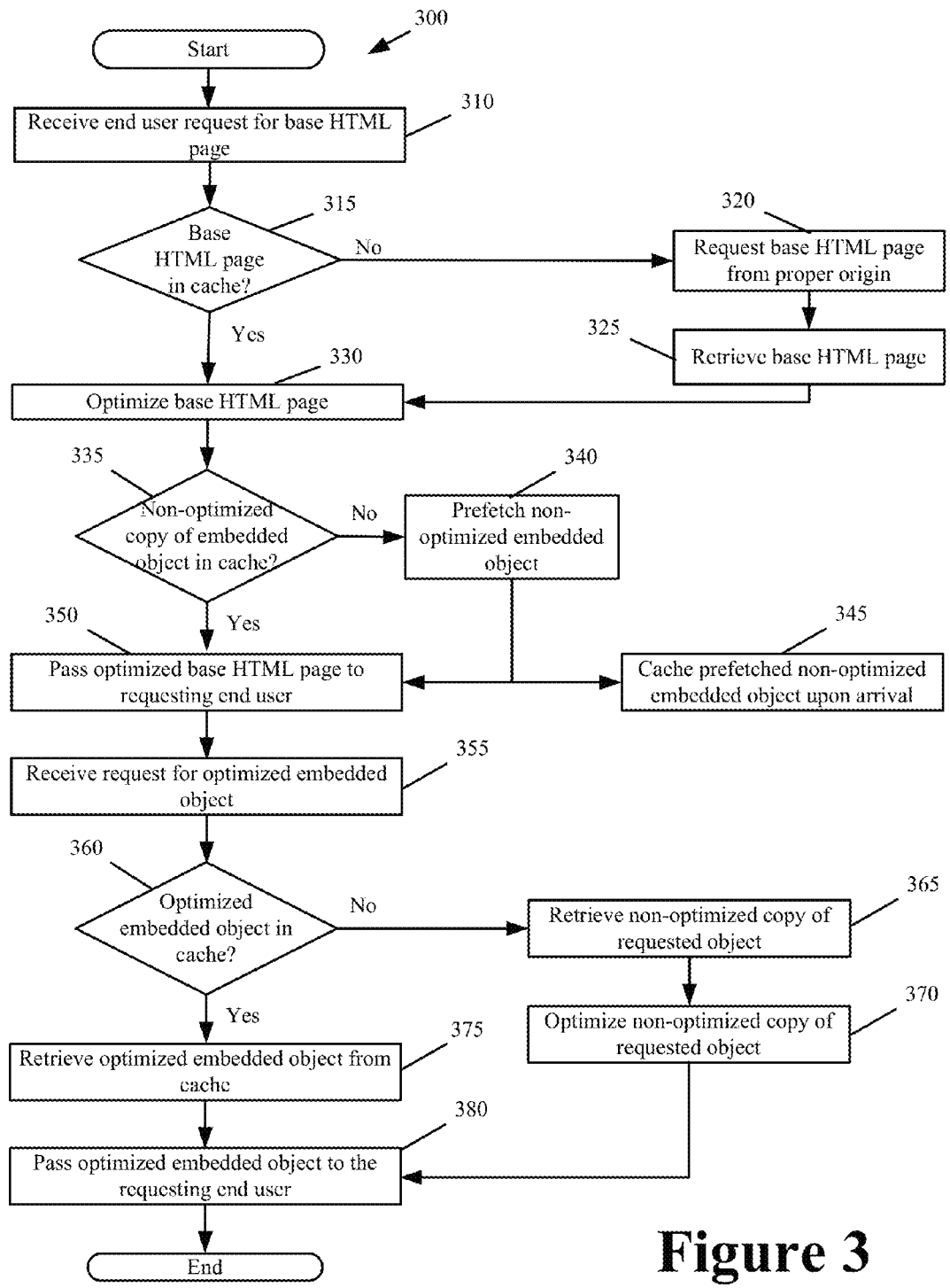
FIG. 3 presents a process that illustrates the interworking between agents in a CDN PoP for the purpose of sandboxing content optimization at the network edge in accordance with some embodiments.

FIG. 3 presents a process 300 that illustrates the interworking between agents in a CDN PoP for the purpose of sandboxing content optimization at the network edge in accordance with some embodiments. The process 300 commences by receiving (at 310) an end user request for content. Typically, requesting content occurs as a series of requests. Often, the first step in the series is to request a base HTML page. The base HTML page defines a framework for the content and the various embedded objects within the framework that render the content in its final state. Accordingly, the request received at 310 is a request for a base HTML page. The end user is any entity that submits a request for content from any network enabled device and the request is routed to any front-end agent within the CDN PoP.

The process determines (at 315) if the requested base HTML page is cached. If not, the process requests (at 320) the base HTML page from the appropriate origin. Otherwise, the base HTML page is retrieved from cache (at 325).

Next, the process optimizes (at 330) the base HTML page. Some embodiments perform a two part optimization of the base HTML page. The first part of the optimization involves optimizing the content of the base HTML page such that the bandwidth required to pass the optimized base HTML page is less than the bandwidth required to pass the non-optimized or original base HTML page. Optimizing the base HTML page may include removing comments and whitespace as some examples to reduce the file size. This may further include compressing the page or removing unnecessary attributes. The second part of the optimization involves analyzing the embedded objects that are linked in the base HTML page in order to identify which, if any, optimizations can be applied to the embedded objects. In some embodiments, the mod_pagespeed module includes algorithms that identify the best practice optimizations that can be applied to various content and content types. For those objects that can be optimized, the process rewrites their URLs in the base HTML page. The rewritten URLs cause the end user receiving the optimized base HTML page to request the optimized embedded objects instead of the non-optimized objects referenced in the non-optimized base HTML page.

The process queries the distributed network edge cache to determine (at 335) if non-optimized copies of the embedded objects are cached. When the non-optimized copies are not cached, the process begins prefetching (at 340) the non-optimized embedded objects from the proper origin contemporaneously with passing (at 350) the optimized base HTML page to the requestor. The prefetched non-optimized embedded objects are cached (at 345) upon arrival from the origin. As a result, the non-optimized embedded objects are made available in local cache before subsequent requests for those objects are received by the end user. While retrieving and caching the non-optimized copies, the process passes (at 350) the optimized base HTML page to the requestor without any prefetching.

Some time after sending the optimized base HTML page to the requestor, the process receives (at 355) a request for at least one of the rewritten URLs identifying a request for at least one of the optimized embedded objects. The process queries the distributed cache to determine (at 360) if the optimized embedded object is already cached. When the requested optimized embedded object is cached, the process retrieves (at 375) the optimized embedded object from cache and passes (at 380) the optimized object to the requestor. When the requested optimized embedded object is not cached, the process retrieves (at 365) a non-optimized copy of the object from cache, optimizes (at 370) it according to the identified best practices for that object, optionally caches the resulting optimized object, and passes (at 380) the optimized object to the requestor.

Process 300 sandboxes content optimization at the network edge because by the time the end user receives the optimized base HTML page, processes the optimized base HTML page, and requests an optimized embedded object therein from the CDN, the process will have retrieved the non-optimized copy of the embedded object from an origin (i.e., prefetched) or from cache. As a result, when the request for the optimized embedded object is received by a CDN edge server, content optimization can occur wholly at the network edge irrespective of whether the optimized object is cached or is generated from a non-optimized copy of the object that is either prefetched or retrieved from cache.

In some embodiments, the process optimizes the non-optimized object prior to the request for the optimized object being received. Stated differently, the optimization may occur as soon as the non-optimized object is retrieved from the origin (when prefetching) or from the distributed cache of the network edge (when cached) in anticipation of the incoming request for the optimized object from the requestor.

Figure 4:
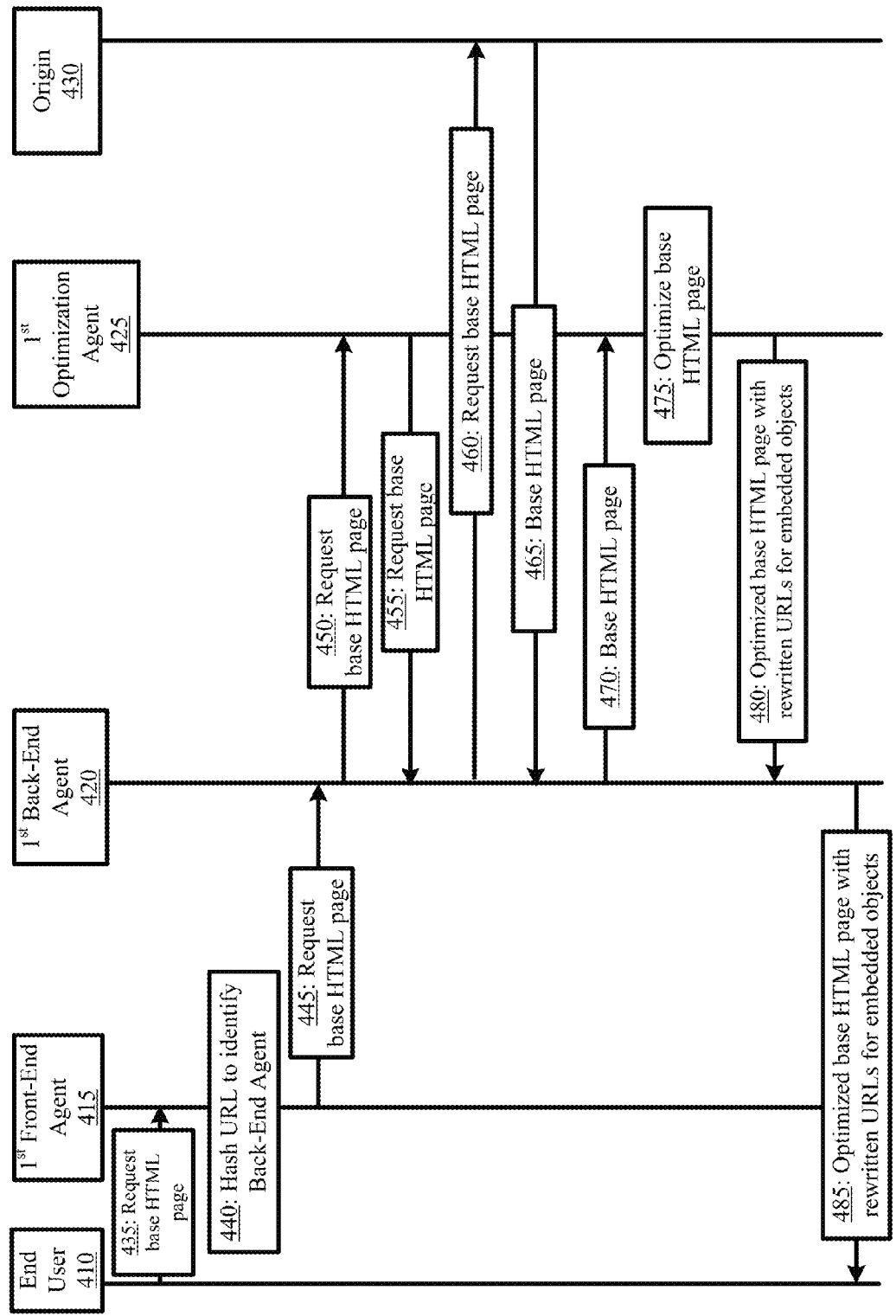
FIG. 4 presents an exemplary message flow for initiating sandboxed content optimization at the network edge by optimizing a base HTML page in accordance with some embodiments.
Figure 5:
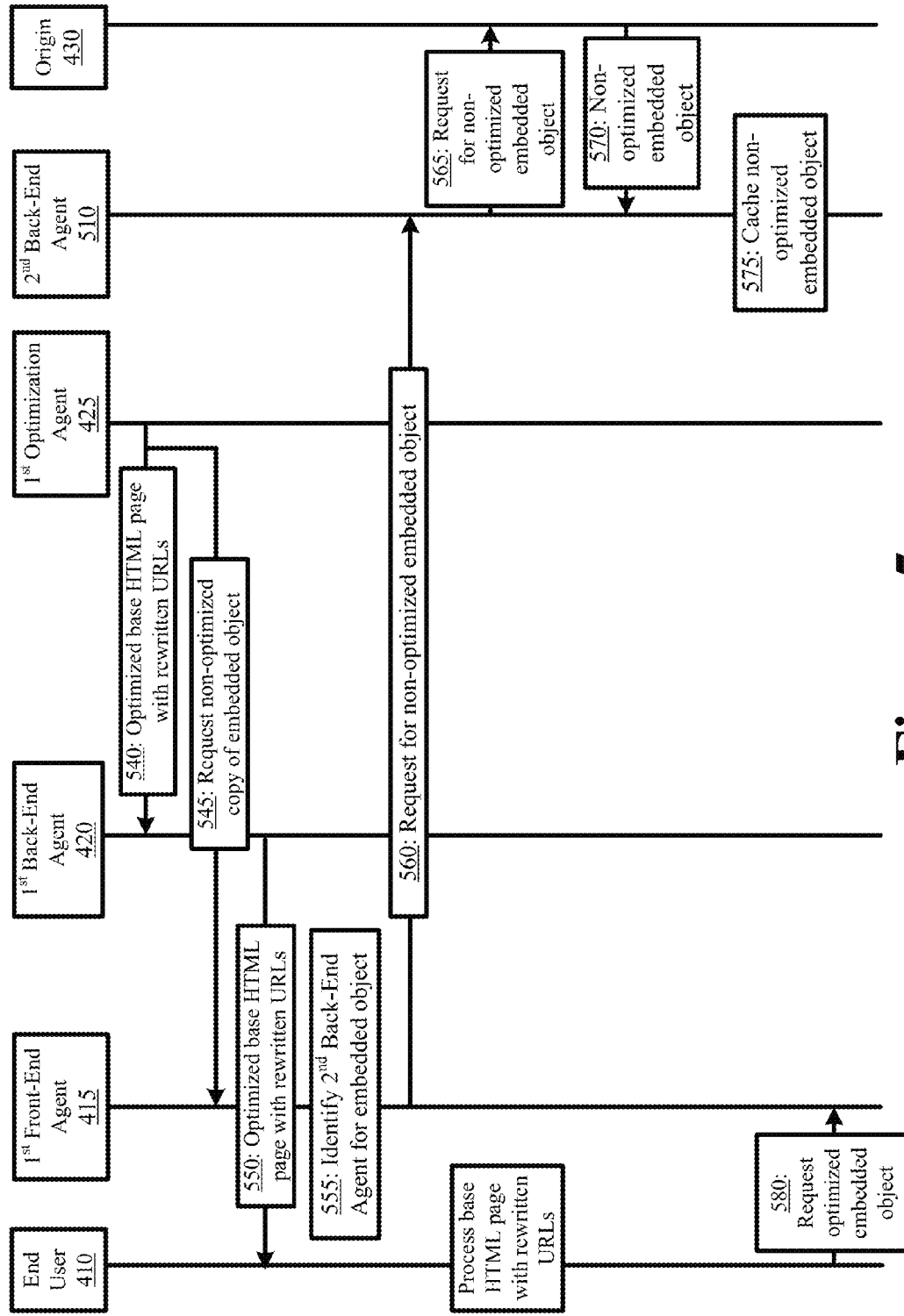
FIGS. 5-6 presents a message flow diagram that illustrates how the distributed CDN architecture and interworking of the agents enables sandboxing content optimization at the network edge by prefetching and optimizing the prefetched content in advance of the content being requested in accordance with some embodiments.
Figure 6:
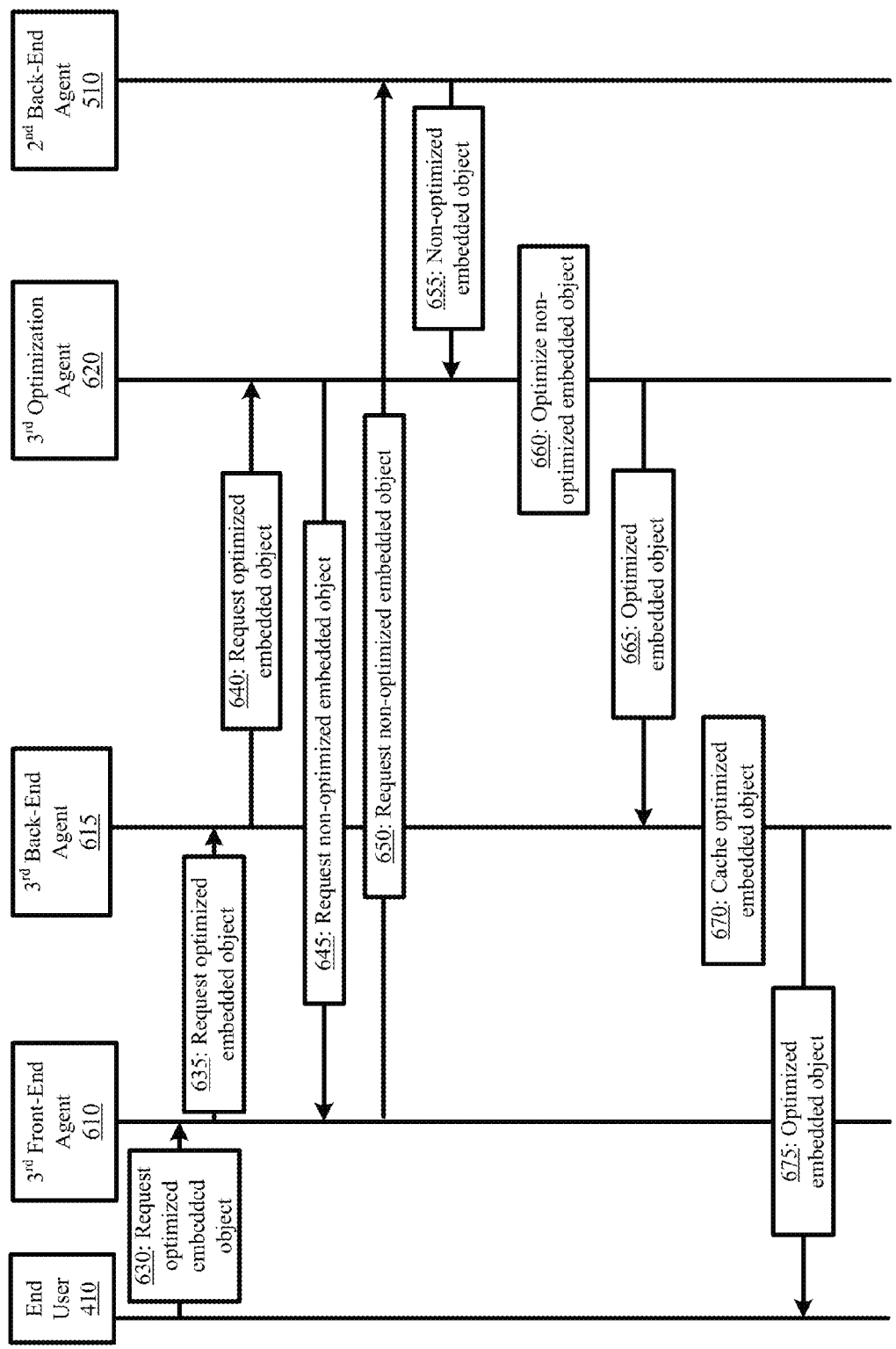

FIGS. 4-6 illustrate an exemplary message flow for content that is first requested from a PoP of the CDN and how the distributed architecture in conjunction with the interworking of the agents sandboxes the optimization for that content at the network edge. Each figure depicts a different stage in this process. For instance, FIG. 4 depicts an exemplary message flow for optimizing a base HTML page, FIG. 5 depicts an exemplary message flow for prefetching content, and FIG. 6 depicts an exemplary message flow for optimizing content within the network edge. Some of the same agents are depicted at different stages of these message flows, though different agents are introduced where appropriate. The figures collectively illustrate the interactions between a specific end user 410, a first front-end agent 415, a first back-end agent 420, a first optimization agent 425, an origin 430, a second back-end agent 510, a third front-end agent 610, a third back-end agent 615, and a third optimization agent 620. The first front-end agent 415, the first back-end agent 420, the first optimization agent 425, the second back-end agent 510, the third front-end agent 610, the third back-end agent 615, and the third optimization agent 620 operate in the same network edge or the same CDN PoP. Also, based on the deterministic identification of which back-end agent is tasked with caching and serving what content, the first back-end agent 420 may be the same or different than either or both of the second back-end agent 510 and third back-end agent 615.

FIG. 4 presents an exemplary message flow for initiating sandboxed content optimization at the network edge by optimizing a base HTML page in accordance with some embodiments. The message flow begins with the end user 410 submitting (at 435) a request for a base HTML page. The end user request for the base HTML page is routed to an enhanced CDN edge server and, more specifically, to the first front-end agent 415 of that enhanced CDN edge server.

The first front-end agent 415 hashes (at 440) the URL addressing the base HTML page. As noted above, this request is typically encapsulated within a HTTP GET request packet. The URL is extracted from the HTTP GET request packet. In this figure, the hashing identifies the first back-end agent 420 as being tasked with caching and serving the requested base HTML page. Accordingly, the first front-end agent 415 passes (at 445) the base HTML page request to the first back-end agent 420.

The first back-end agent 420 identifies whether the requested content is tagged for optimization. In some embodiments, each back-end agent of the CDN includes a configuration that identifies content that should be optimized and content that should not be optimized. The identification may be based on a domain name or URL. For instance, the configuration may specify that requests for content in the domain "example1.com" should not be optimized, whereas requests for content having the URL "www.sample.com/home.html" should be optimized. The configuration can also specify on a customer by customer or content by content basis which of several supported optimizations should be applied to content designated for optimization. In this manner, the CDN administrator or CDN customer can control which content is optimized at the network edge and how the optimization is to occur. Accordingly, optimizing content at the network edge can be provided as an enhanced paid service of the CDN or can be provided when it is known that the optimizations will improve the content delivery performance of certain content for certain CDN customers. Further description for providing content optimization as an enhanced paid service is provided with reference to FIGS. 9 and 10 below.

When the base HTML request is not tagged for optimization, the first back-end agent 420 operates as would a traditional CDN edge server. Namely, the first back-end agent 420 queries its local cache to determine if a fresh instance of the base HTML is in cache. If so, the first back-end agent 420 serves the base HTML page to the end user 410 from cache. Otherwise, the first back-end agent 420 retrieves a copy of the base HTML page from an origin before forwarding the content to the end user 410.

However to illustrate the content optimization message flow, it is assumed that the base HTML request is tagged for optimization. In such instances, the first back-end agent 420 does not serve the requested content to the requesting end user 410 because that content is not optimized. In order to obtain an optimized copy of the requested content, the first back-end agent 420 passes (at 450) the base HTML page request to the first optimization agent 425.

The first optimization agent 425 queries its local cache to determine if a copy of the non-optimized page or optimized page is locally cached. If not, the first optimization agent 425 requests (at 455) a copy of the base HTML page from the back-end agent 420. In some embodiments, the first optimization agent 425 can directly pass the request back to the first back-end agent 420. In some other embodiments, the first optimization agent 425 passes the request back to the first back-end agent 420 by way of the first front-end agent 415. The first back-end agent 420 can differentiate the request passed from the first optimization agent 425 from the request passed from the end user 410 based on one or more identifiers in the request. The identifiers may include the source IP address or one or more special headers that the back-end agents are configured to analyze in determining whether a request originates from within a CDN PoP or externally by an end user. Based on this determination, the first back-end agent 420 knows to retrieve the requested content from cache or from the proper origin instead of again passing the request to the first optimization agent 425.

Upon receiving the base HTML page request from the first optimization agent 425, the first back-end agent 420 determines whether the base HTML page is locally cached or not. When the base HTML page is cached at the first back-end agent 420, the page is retrieved from cache. Otherwise, the first back-end agent 420 requests (at 460) and receives (at 465) the base HTML page from the proper origin 430 as shown in FIG. 4. The first back-end agent 420 optionally caches (not shown) the base HTML page. The first back-end agent 420 then forwards (at 470) a copy of the content to the first optimization agent 425. In some embodiments, the first back-end agent 420 fetches the base HTML page as soon as it passes the request to the first optimization agent 425 at 450.

The first optimization agent 425 analyzes the base HTML page to identify what, if any, optimizations it can apply. As part of the analysis, the first optimization agent 425 may query the metadata cache to determine if the page was already optimized and, if so, the optimized objects that are associated with that page. In some embodiments, the metadata cache stores the URLs for the optimized objects. In some embodiments, the first optimization agent 425 autonomously and dynamically identifies the optimizations that it can apply from a CDN customer configured set of optimizations. The CDN customer can exclude certain optimizations when it is known that those optimizations will have little or no impact. Otherwise, the first optimization agent 425 identifies the optimizations that it can apply from a default set of optimizations.

The first optimization agent 425 optimizes (at 475) the base HTML page in accordance with the identified optimizations. In some embodiments and as was noted above, the first optimization agent 425 performs a two part optimization of the base HTML page. The first part involving optimizing the content of the base HTML page. The second part involving rewriting the URLs for the embedded objects of the base HTML page that can be optimized. The rewritten URLs can be identified from the first optimization agent 425 metadata. Alternatively, the first optimization agent 425 can identify those embedded objects that can be optimized and generate the rewritten URLs accordingly.

The first optimization agent 425 passes (at 480) the optimized base HTML page with any rewritten URLs for embedded objects to the first back-end agent 420. The first back-end agent 420 passes (at 485) the optimized base HTML page to the requesting end user 410. In some embodiments, the first back-end agent 420 passes the optimized base HTML page to the requesting end user 410 through a network path that includes the first front-end agent 420. In some embodiments, the first back-end agent 420 passes the optimized base HTML page to the requesting end user 410 through a network path that does not include the first front-end agent 420.

This completes the first step in the series of steps by which the end user 410 obtains optimized content from the CDN. Upon receiving the optimized base HTML page, the end user 410 will begin the next step to request the optimized objects that are embedded in the optimized base HTML page, wherein the optimized embedded objects are identified by the rewritten URLs. In anticipation of the end user 410 requests for the optimized embedded objects, one or more enhanced edge servers of the CDN begin the task of prefetching and/or optimizing the objects. In other words, during the time it takes the end user 410 to (1) receive the optimized base HTML page, (2) process the optimized base HTML page, and (3) request the optimized embedded objects, one or more back-end agents in combination with one or more optimization agents will have already began the task of readying the optimized objects for delivery to the end user 410 whether or not the optimized objects or non-optimized copies of those objects are cached as a result of earlier requests for those objects. More specifically, one or more back-end agents at the network edge will have cached the content needed by the optimization agents to perform the identified optimizations on the embedded objects of the base HTML page by the time the requests for those objects arrive at the network edge from the end user 410.

FIG. 5 presents a message flow diagram that illustrates how the distributed CDN architecture and interworking of the agents enables sandboxing content optimization at the network edge by prefetching and optimizing the prefetched content in advance of the content being requested in accordance with some embodiments. As shown, this message flow wholly or partially occurs during the time it takes the end user 410 to receive the optimized base HTML page, process the optimized base HTML page, and request the optimized embedded objects of the optimized base HTML page.

In continuation of the message flow of FIG. 4, the message flow of FIG. 5 commences when the first optimization agent 425 passes (at 540) the optimized base HTML page to the first back-end agent 420 in order for the first back-end agent 420 to deliver (at 550) the optimized base HTML page to the end user 410. Contemporaneous with passing of the optimized base HTML page from the first optimization agent 425 to the first back-end agent 420, the first optimization agent 425 requests each of the objects embedded in the optimized base HTML that have not already been optimized from the distributed cache.

The first optimization agent 425 identifies which objects have already been optimized by inspecting local metadata. For each object that has been previously optimized, the optimization agent 425 logs the rewritten URL of that optimized object. The actual copy of the optimized object is stored to cache of a back-end agent elsewhere at the network edge, wherein that back-end agent is deterministically identified by the hashing performed by any of the front-end agents at that network edge. If a rewritten URL created for the optimized base HTML page matches an existing entry in the metadata, the first optimization agent 425 does not send a request for the non-optimized copy of the object. If no entry in the metadata matches to the rewritten URL created for the optimized base HTML page, the first optimization agent 425 submits a request for a non-optimized copy of the object. The non-optimized copy of the object is identified by the URL contained within the non-optimized base HTML page retrieved at 465 of FIG. 4.

To continue the description for sandboxing content optimization at the network edge, the discussion will proceed with reference to a single embedded object that has not been previously optimized. Accordingly, the first optimization agent 425 submits (at 545) a request to the first front-end agent 415 for a non-optimized copy of the embedded object. As earlier noted, the request is for a URL from the non-optimized base HTML page that links to the non-optimized copy of the object.

The first front-end agent 415 identifies (at 555) the second back-end agent 510 as being tasked with the caching and serving of the non-optimized embedded object. The second back-end agent 510 may be hosted by the same enhanced CDN edge server that hosts the first back-end agent 420 or may be hosted by another enhanced CDN edge server that is within the same PoP as the enhanced edge server hosting the first back-end agent 420. The first front-end agent 415 passes (at 560) the request for the non-optimized embedded object to the second back-end agent 510.

To demonstrate the prefetching functionality, it is assumed that the second back-end agent 510 does not have a copy of the non-optimized embedded object in cache. Accordingly, the second back-end agent 510 passes (at 565) the request to origin 530 which then returns (at 570) a copy of the non-optimized embedded object to the second back-end agent 510. The second back-end agent 510 caches (at 575) the non-optimized embedded object. As noted in FIG. 4, the second back-end agent 510 directly passes the request to origin 530 instead of an optimization agent when it identifies the request as coming from an optimization agent.

In some embodiments, the second back-end agent 510 can return the retrieved non-optimized copy of the embedded object to the first optimization agent 425 and the first optimization agent 425 can produce an optimized copy of the embedded object to provide to the first back-end agent 420. The first back-end agent 420 however will not cache this optimized embedded object when it is not tasked with caching and serving the optimized embedded object.

It is worth reiterating that the non-optimized copy of the object is fetched and cached during the time period in which the optimized base HTML page is delivered to the end user 410, the end user 410 processes the optimized base HTML page, and the end user 410 requests (at 580) the optimized embedded object from the CDN. By the time the end user 410 requests (at 580) the optimized embedded object from the CDN, the non-optimized embedded object can be optimized entirely within the network edge. Such sandboxed optimization of the embedded object is illustrated by the message flow diagram of FIG. 6 that is in accordance with some embodiments.

The message flow diagram of FIG. 6 commences when the end user 410 requests (at 630) the optimized embedded object from the CDN based on the rewritten URL within the optimized base HTML page. In this message flow, the request is passed to a third front-end agent 610. The third front-end agent 610 may be the same front-end agent as the first front-end agent 415 or may include any other front-end agent that is in the same PoP as the first front-end agent 415.

Based on a hash of the rewritten URL used in requesting the optimized embedded object, the third front-end agent 610 identifies and passes (at 635) the request to the third back-end agent 615. As before, the hashing identifies the third back-end agent 615 as the back-end that is tasked with caching and serving the optimized embedded object, whereas the second back-end agent 510 was tasked with caching and serving the non-optimized embedded object. The third back-end agent 615 may be the same as the first back-end agent 420 when the third back-end agent 615 is tasked with caching and serving the optimized embedded object and the base HTML page. Similarly, the third back-end agent 615 may be the same as the second back-end agent 510 when the third back-end agent 615 is tasked with caching and serving the optimized embedded object and the non-optimized embedded object.

The third back-end agent 615 queries its local cache to determine if the optimized embedded object is cached. For the purpose of this figure, it is assumed that the optimized embedded object is not cached by the third back-end agent 615. Accordingly, the third back-end agent 615 passes (at 640) the request for the optimized embedded object to the third optimization agent 620 when the optimized embedded object is not cached. In some embodiments, the third back-end agent 615 passes the request to the third optimization agent 620 instead of an origin outside the network edge when it identifies the request as one for optimized content based on the rewritten URL. In some embodiments, the third back-end agent 615 passes the request to the third optimization agent 620 instead of an origin outside the network edge when it identifies the request as having originated from the end user 410 outside the network edge as opposed to having originated from an optimization agent within the network edge.

The third optimization agent 620 queries its cache to determine if the optimized object was previously created and stored to cache. If not, the third optimization agent 620 requires a copy of the non-optimized object in order to produce the optimized copy. The third optimization agent 620 extracts a URL for the non-optimized object from the rewritten URL. This is possible when the rewritten URL appends or prepends various identifiers to the original URL identifying the non-optimized object. For example, the original URL identifying the non-optimized object may be "original_path/object_name.object_type" and the rewritten URL identifying the optimized object may be "original_path/pagespeed_identifier.optimization_identifier.object_name.object_type". In this example, the first element and last two elements of the rewritten URL format identify the URL of the non-optimized object. The third optimization agent 620 requests (at 645) the non-optimized object from the third front-end agent 610.

The third front-end agent 610 identifies the second back-end agent 510 as the back-end agent that is tasked with caching and serving the non-optimized object. Accordingly, the front-end agent 610 passes (at 650) the request for the non-optimized object to that second back-end agent 510. As a result of the prefetching performed via the message flow of FIG. 5, the second back-end agent 510 will have the non-optimized content in cache and will thus be able to return (at 655) the non-optimized content to the third optimization agent 620 from cache.

The third optimization agent 620 performs (at 660) the identified optimizations to the non-optimized object, thereby producing the optimized object. The optimized object is then passed (at 665) from the third optimization agent 620 to the third back-end agent 615. The third back-end agent 615 caches (at 670) the optimized object and serves (at 675) the optimized object to the requesting end user 410. As can be seen from this message flow, the entire process from when the end user submits the request for the optimized embedded object at 630 to the delivery of the optimized embedded object to the end user at 675 is wholly sandboxed at the network edge. Moreover, the described architecture and interworking preserves the content optimization within the network edge even when objects are not previously cached therein based on the prefetching that occurred prior to the end user 410 request for the embedded object.

The cache of the second back-end agent 510 can continue to be used by the third optimization agent 620 and other optimization agents within the same PoP to produce different optimizations for the cached non-optimized object. For example, different optimizations for the non-optimized object that is stored to the second back-end agent 510 may be received by different optimization agents that operate within the same PoP as the second back-end agent 510. Each optimization of the object is identified by a different rewritten URL. Accordingly, the requests for the rewritten URLs can be distributed to different back-end agents and, ultimately, to different optimization agents that operate within the same PoP as the second back-end agent 510. However, each of the different rewritten URLs will contain the original URL. The different optimization agents can therefore request the non-optimized object from any front-end agent in the PoP and those front-end agents will each deterministically identify the second back-end agent 510 as caching the non-optimized object. The second back-end agent 510 distributes a copy of the non-optimized object to each requesting optimization agent. The optimization agents then produce the different optimizations without having made a single access outside the network edge. The leveraging of the distributed cache and reuse of cached non-optimized content is illustrated in FIG. 7.

Figure 7:
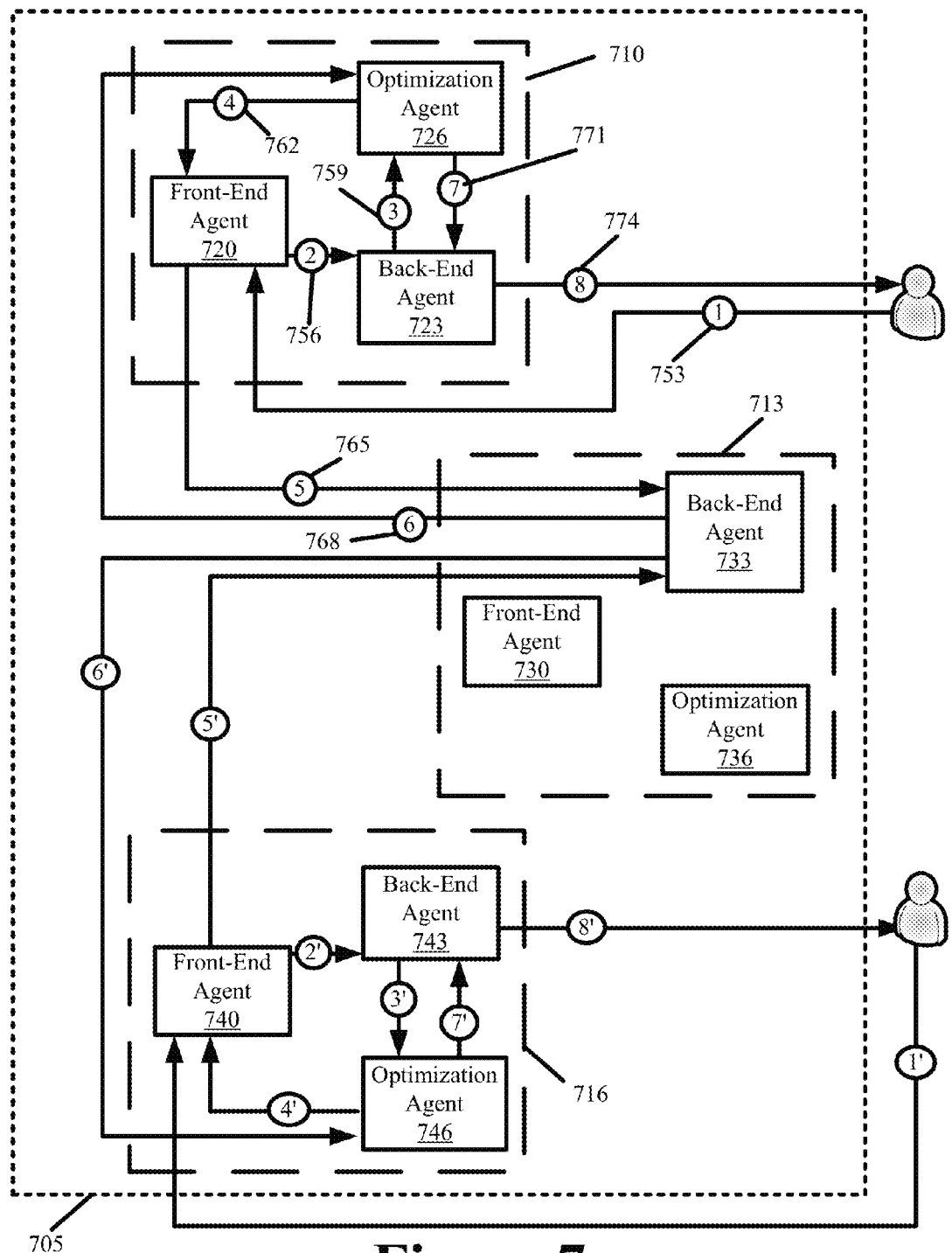
FIG. 7 illustrates leveraging the distributed cache for the purpose of reusing cached non-optimized content to optimize the cached content.

FIG. 7 illustrates three enhanced edge servers 710, 713, and 716 that operate in a given CDN PoP 705. Enhanced edge server 710 includes front-end agent 720, back-end agent 723, and optimization agent 726. Enhanced edge server 713 includes front-end agent 730, back-end agent 733, and optimization agent 736. Enhanced edge server 716 includes front-end agent 740, back-end agent 743, and optimization agent 746. The caches of the back-end agents 723, 733, and 743 yield the distributed cache for this PoP 705. Also, back-end agent 733 is configured to cache and does cache particular non-optimized content.

As shown, when a request for a first optimization of the particular non-optimized content is received (at 753) at the front-end 720, passed (at 756) to the back-end agent 723, and passed (at 759) to the optimization agent 726, the optimization agent 726 requests (at 762) the particular non-optimized content from the front-end agent 720. The front-end agent 720 deterministically identifies based on the URL for requesting the particular non-optimized content that the back-end agent 733 is configured to cache and serve the particular non-optimized content. Accordingly, the front-end agent 720 forwards (at 765) the request for the particular non-optimized content to the back-end agent 733 which then provides (at 768) the particular non-optimized object to the optimization agent 726. The optimization agent 726 produces the first optimization of the particular non-optimized object and passes (at 771) the first optimization to the back-end agent 723. The back-end agent 723 caches the first optimization and serves (at 774) the first optimization to the requesting end user.

Similarly, when a request for a second optimization of the particular non-optimized content is received at the front-end 740, passed to the back-end agent 743, and passed to the optimization agent 746, the optimization agent 746 requests the particular non-optimized content from the front-end agent 740. The front-end agent 740 deterministically identifies based on the URL for requesting the particular non-optimized content that the back-end agent 733 is configured to cache and serve the particular non-optimized content. Accordingly, the front-end agent 740 forwards the request for the particular non-optimized content to the back-end agent 733 which then provides the particular non-optimized object to the optimization agent 746. The optimization agent 746 produces the second optimization of the particular non-optimized object and passes the second optimization to the back-end agent 743. The back-end agent 743 caches the second optimization and serves the second optimization to the requesting end user.

The optimization agents 726 and 746 leverage the cache of the back-end agent 733 to sandbox content optimization entirely within the network edge. Moreover, the front-end agents enable the optimization agents 726 and 746 to retrieve desired content from any back-end agent of the PoP 705 such that the cache of each back-end agent in the PoP 705 can be pooled together to form a distributed cache.

Also, by leveraging the distributed cache to cache optimized objects along with non-optimized objects, the CDN realizes greater content delivery performance gains. Specifically, the CDN is able to deliver the optimized embedded object directly from cache, without having to prefetch the non-optimized object from an origin and without having an optimization agent perform the optimizations that produce the optimized object.

Figure 8:
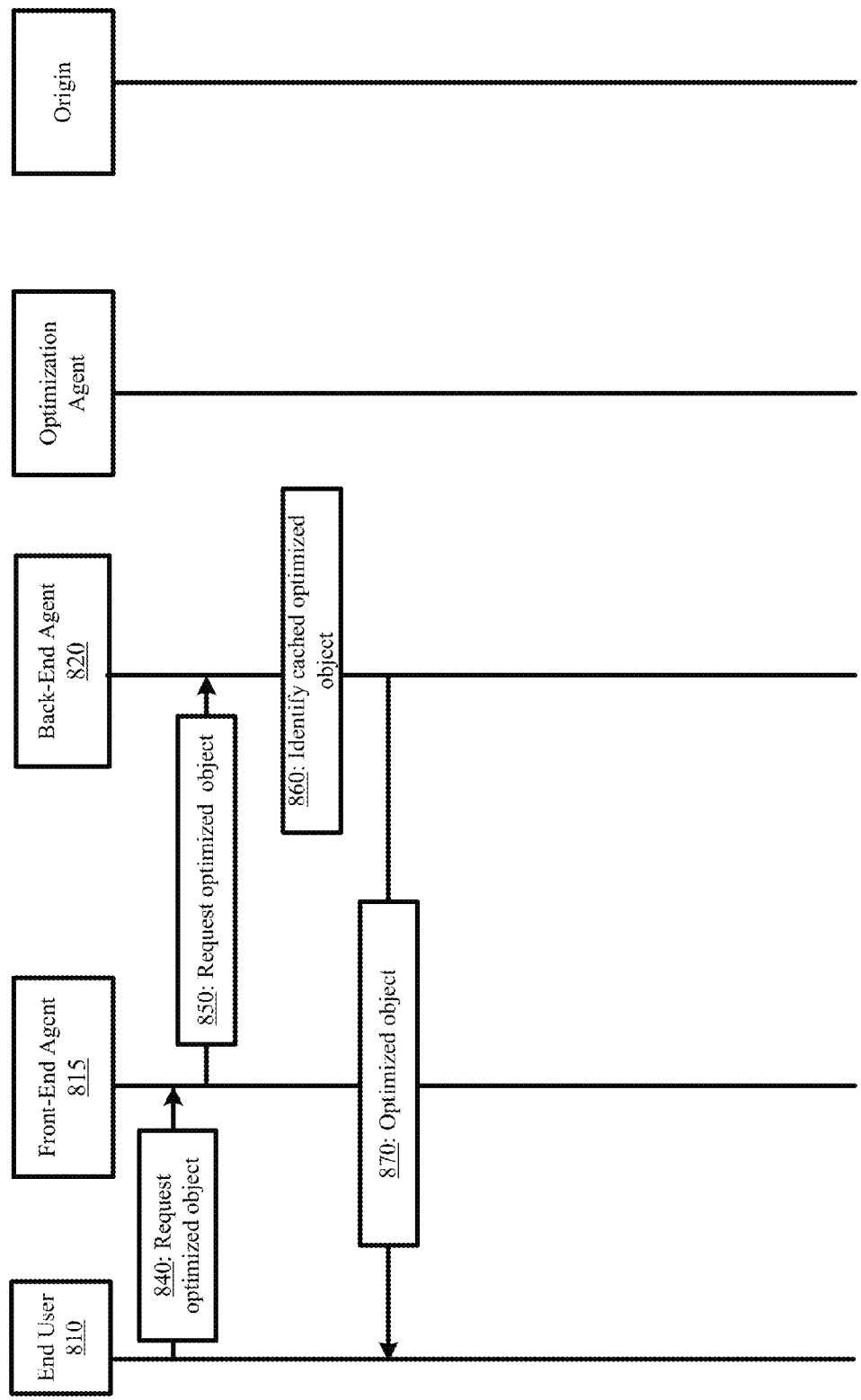
FIG. 8 illustrates serving optimized content from cache in accordance with some embodiments.

FIG. 8 illustrates serving optimized content from cache in accordance with some embodiments. Here again, the message flow commences when an end user 810 submits (at 840) a request for the object that was optimized and cached as a result of the message flows of FIGS. 4-6. The illustrated front-end agent 815, back-end agent 820, and optimization agent are located in the same PoP as the agents of FIGS. 4-6.

The front-end agent 815 receives the request from the end user 810. The front-end agent 815 can be any of the first front-end agent 415, third front-end agent 615, or any other front-end agent in that specific PoP. The front-end agent 815 deterministically identifies the back-end agent 820 that is tasked with caching and serving the optimized object. With reference to FIG. 6, the back-end agent 820 is the third back-end agent 615. The front-end agent 815 passes (at 850) the request to the back-end agent 820. The back-end agent 820 identifies (at 860) the request as one for optimized content that is already in cache. Accordingly, the back-end agent 820 serves (at 870) the content from cache to the end user 810 without any network access outside the network edge. Content delivery performance of the CDN is also improved since the processing overhead associated with generating the optimized object from a non-optimized copy of the object is eliminated as a result of having previously cached the optimized object.

Any CDN customer is able to benefit from the sandboxed content optimizations and the resulting content delivery performance gains derived as a result. By providing such functionality, the CDN relieves its customers from the time and expense of identifying the best practice optimizations and performing those optimizations themselves. The customers can instead devote more time to content creation and rely on the CDN to optimize the created content.

To simplify the ability for any CDN customer to benefit from the sandboxed content optimizations and the resulting content delivery performance gains, some embodiments offer one or more graphical user interfaces (GUIs) for enabling, disabling, and customizing the content optimization service per the customer's needs. The GUIs can be hierarchical. For instance, FIG. 9 illustrates a first GUI interface for enabling and disabling content optimization and FIG. 10 illustrates a second GUI interface for customizing which optimizations to apply.

Figure 9:
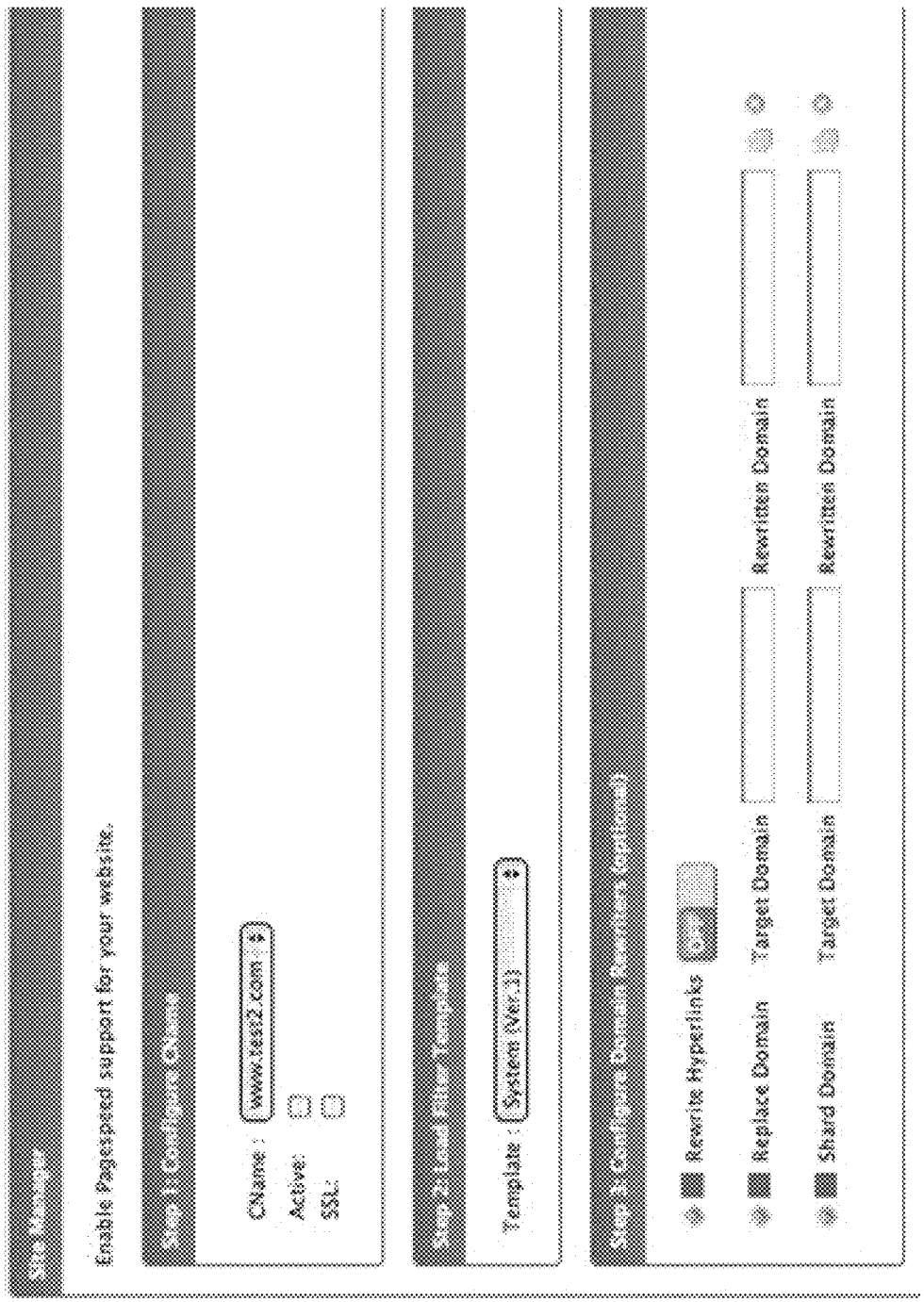
FIG. 9 illustrates a first GUI interface for enabling and disabling content optimization.

As illustrated in the GUI of FIG. 9, a CDN customer can configure a CNAME or alias to be used to request the optimized content. Additionally, the CDN customer selects a template. The template specifies the optimizations that will be applied to the CDN customer content. The template enables a default set of optimizations which can subsequently be customized using the GUI of FIG. 10. By way of the templates and subsequent customizations to the templates, the CDN is able to optimize the content of its customers differently. In some embodiments, a CDN customer can select different templates for different subsets of the CDN customer content. In this manner, the CDN customer is able to specify different customizations that the CDN is to perform on the different subsets. The optimizations specified in the selected template are encoded as a configuration file. The configuration file is used by the enhanced CDN edge servers and more specifically, by the optimization agents, to determine which optimizations to apply for which content. The configuration file can be installed on each edge server. Alternatively, the configuration file can reside in a central repository at each particular PoP such that the configuration file is accessible to each edge server within the particular PoP.

Figure 10:
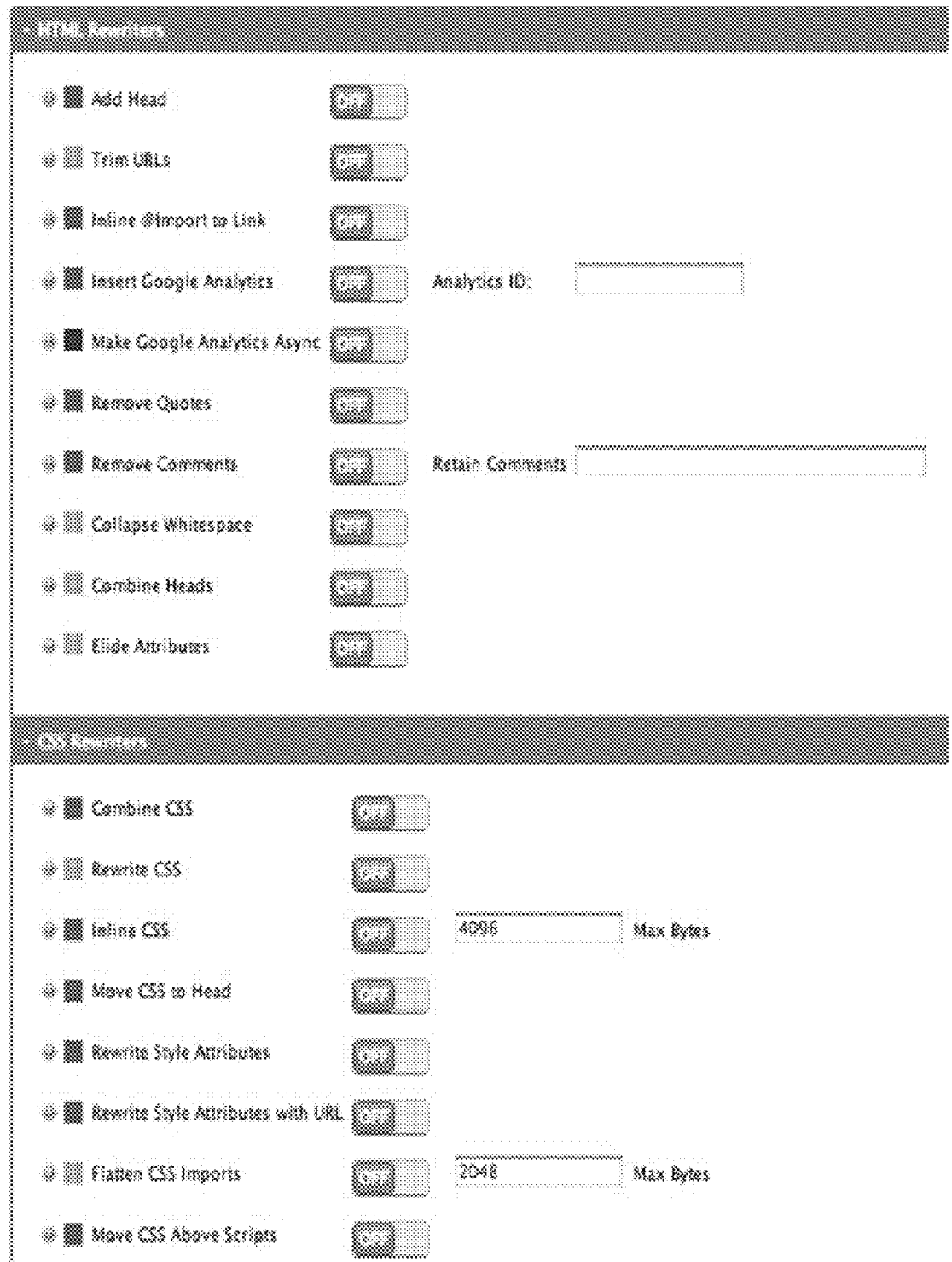
FIG. 10 illustrates a second GUI interface for customizing which optimizations to apply to CDN customer content.

FIG. 10 illustrates a GUI for customizing the optimizations that the optimization agents perform on the content of a particular CDN customer. The customizations modify the default optimizations that are specified in a selected template and that are encoded to the configuration file. The customizations allow CDN customers and CDN administrators the ability to fine tune the content optimizations on a customer-by-customer or content-by-content basis. For instance, certain content may already contain certain optimizations such that the CDN customer can disable the checks for those optimizations, thereby eliminating wasted processing cycles performed at the network edge to ascertain whether those optimizations were previously performed and the processing cycles to perform those optimizations.

As shown, the optimizations that can be enabled or disabled include: the "Add Head" filter to add a head to the document if it encounters a <body> tag before finding a <head> tag, the "Trim URLs" filter which resolves URLs by making them relative to a base URL for a page; the "Inline @Import to Link" filter to convert a <style> tag consisting of exactly one @import statement into the corresponding <link> tag; inserting Google Analytics; loading Google Analytics asynchronously, the "Remove Quotes" filter to remove unnecessary quotation marks from HTML attributes; the "Remove Comments" filter to remove comments from the page; the "Collapse Whitespace" filter to remove unnecessary whitespace from the page; the "Combine Heads" filter which combines multiple heads into one; the "Elide Attributes" filter to remove attributes from HTML tags that correspond to default values; the "Combine CSS" filter to reduce the number of HTTP requests by replacing multiple distinct CSS files with a single CSS file; the "Rewrite CSS" filter to minify CSS and rewrite images found in CSS; the "Inline CSS" filter to insert the content of small CSS resources directly in HTML; the "Move CSS to Head" filter to ensure that the CSS styles are all parsed in the head, before any body elements are introduced; the "Rewrite Style Attributes" filter to include CSS minification, image rewriting, image recompression, and cache extension; the "Flatten CSS Imports" filter to replace @import rules with the contents of the imported file; and the "Move CSS above Scripts" filter to ensure that scripts do not block the loading of CSS resources. This listing is an exemplary set of supported mod_pagespeed optimizations. Some embodiments support additional or different optimizations and provide GUI elements for the CDN customer to enable and disable those optimizations.

In addition to or instead of the above mentioned GUIs for setting and customizing the content optimizations for CDN customer content, some embodiments provide an Application Programming Interface (API) with which to set and customize the content optimization. Specifically, the API provides a set of calls that programmatically enable and disable the various optimizations. Using the API, a CDN customer can programmatically control the optimizations that the CDN applies to the CDN customer content.

Many of the above-described processes and agents are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 11:
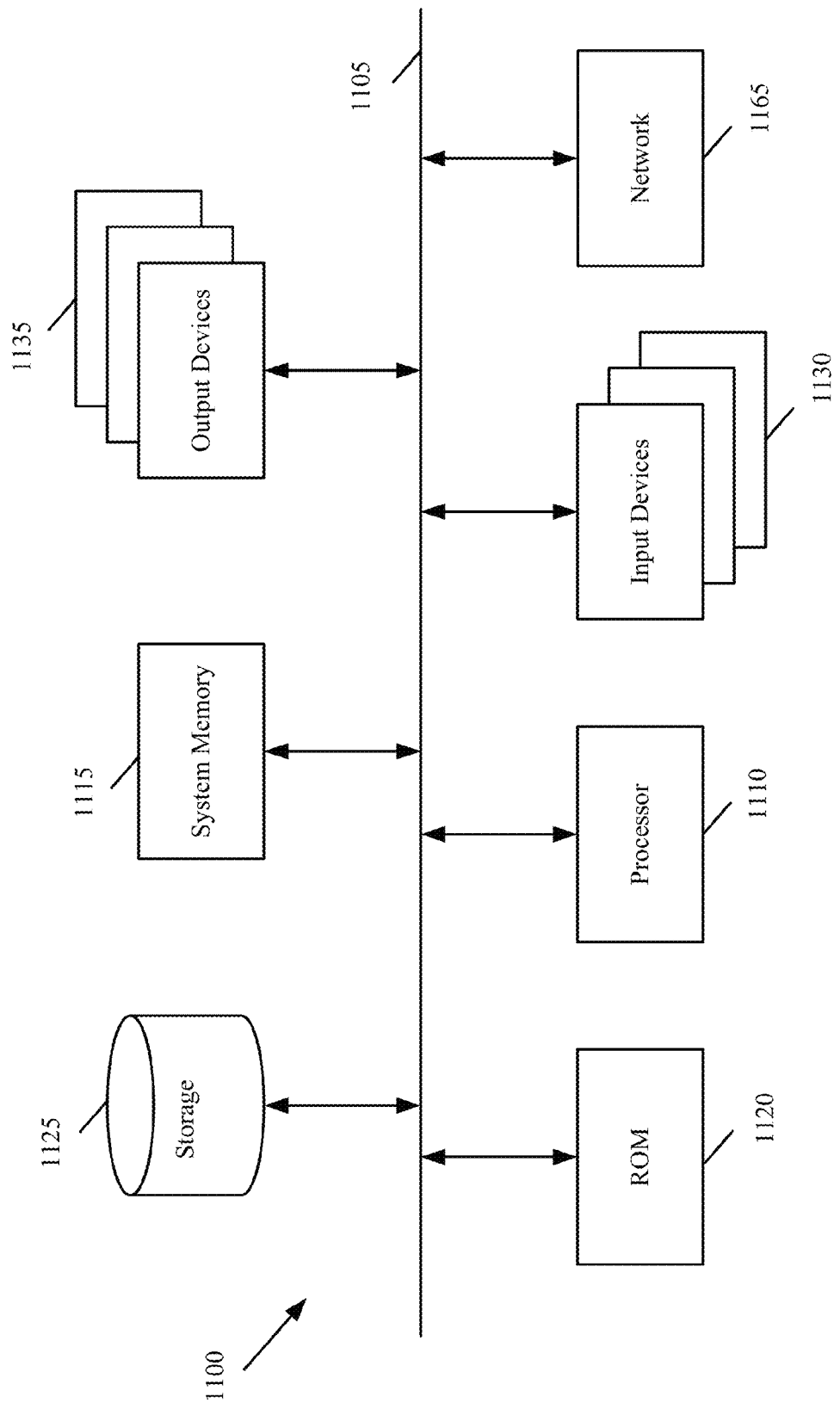
FIG. 11 illustrates a computer system or server with which some embodiments are implemented.

FIG. 11 illustrates a computer system or server with which some embodiments are implemented. Such a computer system includes various types of computer readable mediums and interfaces for various other types of computer-readable mediums that implement the processes for the CDN sandboxed content optimization solution described above (e.g., front-end agents, back-end agents, and optimization agents). Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device Like the permanent storage device 1125, the system memory 1115 is a read-and-write memory device. However, unlike the storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include, but are not limited to, alphanumeric keypads (including physical keyboards and touchscreen keyboards) and pointing devices (also called "cursor control devices"). The input devices 1130 also include audio input devices (e.g., microphones, MIDI musical instruments, etc.). The output devices 1135 display images generated by the computer system. The output devices include, but are not limited to, printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for optimizing content within a Point-of-Presence (PoP) of a distributed platform, wherein the PoP comprises a plurality of collocated servers, the method comprising:

with a first computer having at least one processor operating as a first server of the plurality of collocated servers:
  receiving a first request requesting a non-optimized instance of a particular object;
  retrieving the non-optimized instance of the particular object from an origin server operating outside of said PoP;
  caching the non-optimized instance of the particular object at the first server in conjunction with serving the non-optimized instance of the particular object in response to the first request;

with a second computer having at least one processor operating as a different second server of the plurality of collocated servers:
  receiving a second request requesting an optimized instance of the particular object from a client;
  issuing internally within the PoP, the first request requesting the non-optimized instance from the first server in response to the second request requesting the optimized instance of the particular object and the optimized instance not being cached at the second server;
  retrieving the non-optimized instance of the particular object from the first server without accessing the origin server or any other server operating outside of said PoP;
  generating the optimized instance of the particular object from the non-optimized instance of the particular object retrieved from the first server without access outside the PoP, wherein the optimized instance includes at least one modification to the non-optimized instance of the particular object resulting in a smaller file size for the particular object; and
  serving the optimized instance of the particular object from the second server to the client in response to the second request.

2. The method of claim 1 further comprising partitioning a plurality of content objects across the plurality of servers such that each server of the plurality of servers is tasked with caching and delivering a different subset of the plurality of content objects.

3. The method of claim 2, wherein the first request comprises a first identifier and the second request comprises a second identifier, and the method further comprises deterministically identifying the first server to service the first request based on a hash of the first identifier and deterministically identifying the second server to service the second request based on a hash of the second identifier.

4. The method of claim 1 further comprising caching the optimized instance of the particular object to the second server.

5. The method of claim 1 further comprising, with a third computer having at least one processor operating as a director directing requests across the PoP, directing the first request issued by the second server operating within the PoP to the first server in response to deterministically identifying the non-optimized instance of the particular object being served from the first server and directing the second request issued by the client operating outside the PoP to the second server in response to deterministically identifying the optimized instance of the particular object being served from the second server.

6. A method of optimizing content within a Point-of-Presence (PoP) of a Content Delivery Network (CDN), wherein the PoP comprises a plurality of collocated PoP servers, the method comprising:
receiving at a first PoP server of the plurality of PoP servers, a first request comprising a first identifier identifying an optimized instance of a particular content object from the plurality of content objects, wherein the request is deterministically routed to the first PoP server based on the first identifier, wherein the first identifier is comprised of a second identifier identifying a non-optimized instance of the particular content object and a modifier;
retrieving to the first PoP server, the non-optimized instance of the particular content object from a second PoP server of the plurality of PoP servers in response to receiving the first request requesting the optimized instance of the particular object at the first PoP server and the optimized instance of the particular object not being stored in the first PoP server cache, wherein said retrieving comprises extracting the second identifier identifying the non-optimized instance of the particular object from the first identifier of the first request identifying the optimized instance of the particular object, and issuing a second request comprising the second identifier from the first PoP server for routing to the second PoP server, and wherein the second request deterministically identifies based on the second identifier;
generating at the first PoP server, the optimized instance of the particular content object from the non-optimized instance of the particular content object retrieved from the second PoP server, the second PoP server caching a copy of the non-optimized instance of the particular object instead of an origin server originating the non-optimized instance of the particular object for caching by the second PoP server; and
passing the optimized instance of the particular content object from the first PoP server in response to the request.

7. The method of claim 6 further comprising caching the optimized instance of the particular content object to a non-transitory storage of the first PoP server and retaining the non-optimized instance of the particular content object to a cache of the second PoP server.

8. The method of claim 7 the method further comprising receiving at the first PoP server, a third request comprising the first identifier.

9. The method of claim 8 further comprising passing the optimized instance of the particular content object from the non-transitory storage of the first server in response to the third request without regenerating the optimized instance of the particular content object from the non-optimized instance of the particular content object and without accessing the second PoP server.

10. The method of claim 6, wherein the first identifier is a first Uniform Resource Locator (URL) and the second identifier is a second URL comprising the first URL.

11. The method of claim 6 further comprising receiving from a client, a request for a base page including the second identifier identifying the non-optimized instance of the particular content object that is to be included as part of the base page.

12. The method of claim 11 further comprising producing a modified base page by replacing the second identifier with the first identifier.

13. The method of claim 12 further comprising passing the modified base page to the client while contemporaneously issuing an internal PoP request comprising the first identifier identifying the optimized instance of the particular content object within the PoP, the internal PoP request initiating generation of the optimized instance of the particular object by the first PoP server in advance of a request from the client for the optimized instance of the particular content object.

14. The method of claim 12 further comprising passing the modified base page to the client while contemporaneously issuing an internal PoP request comprising the second identifier identifying the non-optimized instance of the particular content object within the PoP, the internal PoP request prefetching the non-optimized instance of the particular content object to the second PoP server in advance of a request from the client for the optimized instance of the particular content object.

15. A method for optimizing content within a Point-of-Presence (PoP) of a distributed platform, wherein the PoP comprises a plurality of edge servers, the method comprising:
with a computer having at least one processor operating as a first edge server of the plurality of edge servers:
receiving a first request from a client, the first request for requesting content comprising a first identifier to a non-optimized instance of a particular object;
passing contemporaneously in response to the first request, (i) modified content having a different second identifier to an optimized instance of the particular object in place of the first identifier and (ii) a second request specifying the first identifier within the PoP, wherein passing the second request initiates prefetching of the non-optimized instance of the particular object within the PoP prior to the client requesting either of the optimized instance of the particular object and the non-optimized instance of the particular object;
with a computer having at least one processor operating as a second edge server of the plurality of edge servers:
receiving a third request from the client, the third request comprising the second identifier to the optimized instance of the particular object;
retrieving the non-optimized instance of the particular object from within the PoP without accessing an origin server operating outside the POP and originating the non-optimized instance of the particular object as a result of said prefetching;
generating, in response to the third request, the optimized instance of the particular object from the non-optimized of the particular object; and
sending the optimized instance of the particular object to the client.

16. The method of claim 15 further comprising determining at the first edge server, whether a configuration is specified for the content.

17. The method of claim 16 further comprising passing the content without modification in response to the first request when no configuration is specified and passing the modified content in response to the first request when a configuration is specified, wherein the configuration specifies at least one optimization to perform to the content.

18. The method of claim 15 further comprising storing a plurality of customer configurations, each customer configuration specifying at least one optimization that is to be performed on content of the customer.

19. The method of claim 18 further comprising retrieving a particular configuration from the plurality of customer configurations specified by a customer that originates said content, wherein the modified content is generated in accordance with the particular configuration.

20. The method of claim 18 further comprising retrieving a particular configuration from the plurality of customer configurations that is specified by a customer originating said content, wherein the optimized instance of the particular object is generated in accordance with the particular configuration.

* * * * *